(No Model.)
W. E. STEINBACH.
WINDOW JACK.
No. 347,260. Patented Aug. 10, 1886.
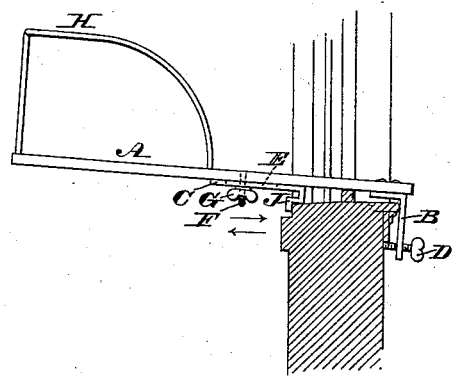
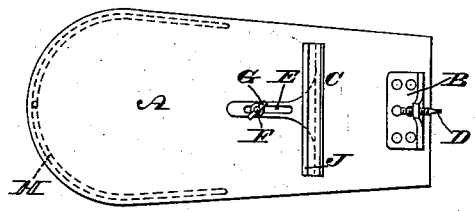
WITNESSES:
A. P. Grant,
N. F. Kirches
INVENTOR:
W. E. Steinbach
BY John A. Wiedersheim
ATTORNEY.
N. PETERS, Photo-Lithographer, Washington, D. C.

UNITED STATES PATENT OFFICE.

WILLIAM E. STEINBACH, OF PHILADELPHIA, PENNSYLVANIA.

WINDOW-JACK.

SPECIFICATION forming part of Letters Patent No. 347,260, dated August 10, 1886.

Application filed April 23, 1886. Serial No. 199,972. (No model.)

*To all whom it may concern:*

Be it known that I, WILLIAM E. STEINBACH, a citizen of the United States, residing in the city and county of Philadelphia, State of Pennsylvania, have invented a new and useful Improvement in Window-Jacks, which improvefiment is fully set forth in the following specification and accompanying drawings, in which—

Figure 1 represents a side elevation of a jack embodying my invention. Fig. 2 represents a bottom plan view thereof.

Similar letters of reference indicate corresponding parts in the two figures.

My invention consists of a jack which may be firmly attached to a window sill, and is adjustable to sills of different sizes.

Referring to the drawings, A represents the platform of a window-jack, to which are secured brackets B C, the bracket B being at the inner end of the platform and the bracket C intermediate of the ends, both brackets projecting downwardly. The bracket B is provided with a horizontally-arranged screw, D, and the bracket C formed with a longitudinally-extending slot, E, through which is passed a bolt, F, which is connected with the platform and provided with a thumb-nut, G, whereby said bracket C may be moved toward and from the bracket B, or adjusted in the transverse direction of a window-sill, said direction being indicated by arrows, Fig. 1. The inner end of the bracket C is formed with a shoulder, J, which is adapted to embrace the upper outer angle of the sill, and the screw D of the bracket B is adapted to tighten against the inner face of the sill, as clearly shown in Fig. 1.

When the bracket C is adjusted, the jack is located on the sill and the screw tightened, whereby the brackets are clamped to the sill, and the jack is securely held in position on the window, this being assured, since the brackets clamp the opposite sides of the sill; and the screw D prevents the ascent of the inner end of the platform. When the screw D is loosened, the jack may be properly removed from the sill.

H represents a railing or guard, which is connected with the sides and outer end of the platform, for preventing the occupant of the platform from moving beyond said end.

I am aware that it is not new to construct a window-jack provided with fastening devices, and such I do not claim.

Having thus described my invention, what I claim as new, and desire to secure by Letters Patent, is—

A window-jack composed of the platform A, with bracket B secured to the inner end thereof, the said bracket being provided with the screw D, the bracket C, with longitudinally-extending slot E and shoulder J, substantially as described, and bolt F, with thumb-nut G, all of said parts being combined substantially as and for the purpose set forth.

W. E. STEINBACH.

Witnesses:
JOHN A. WIEDERSHEIM,
A. P. GRANT.